Aug. 7, 1934.  J. W. TREW  1,969,284
MEANS FOR PACKING FRUIT AND THE LIKE
Filed Jan. 17, 1931   3 Sheets-Sheet 1
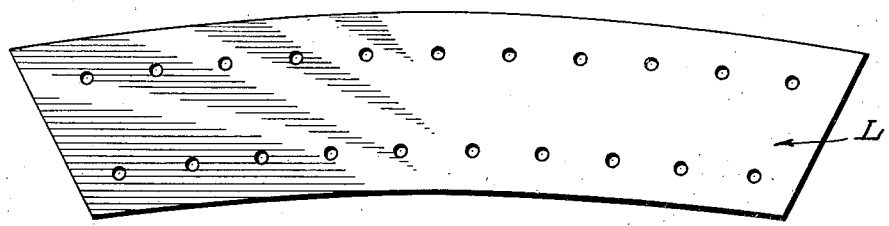
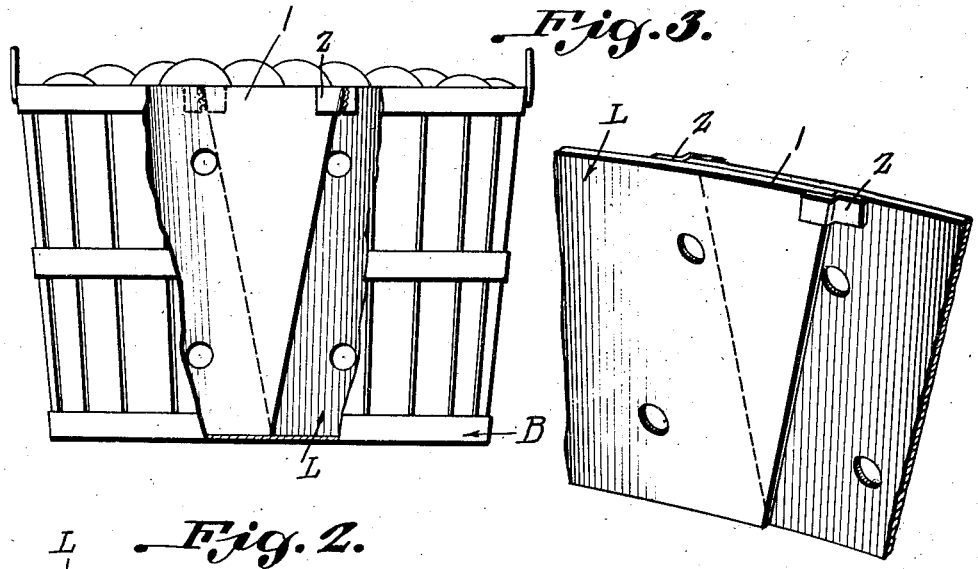
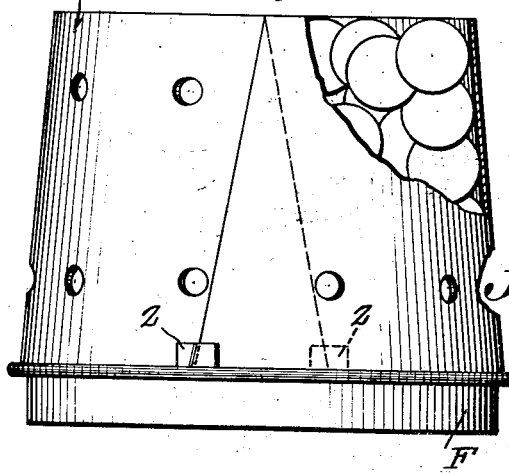
James W. Trew, Inventor Aug. 7, 1934.  J. W. TREW  1,969,284
MEANS FOR PACKING FRUIT AND THE LIKE
Filed Jan. 17, 1931  3 Sheets-Sheet 2
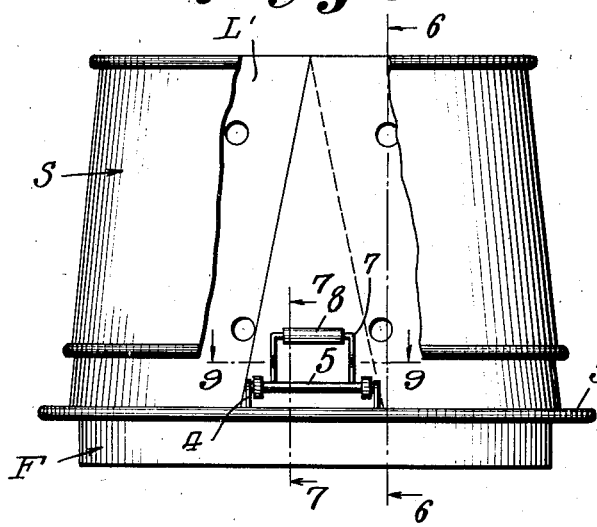
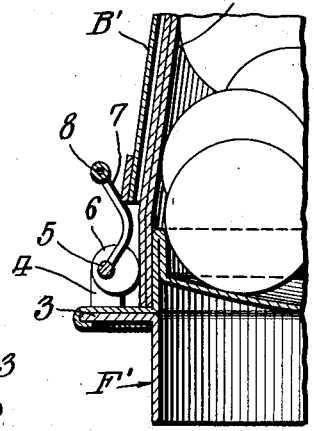
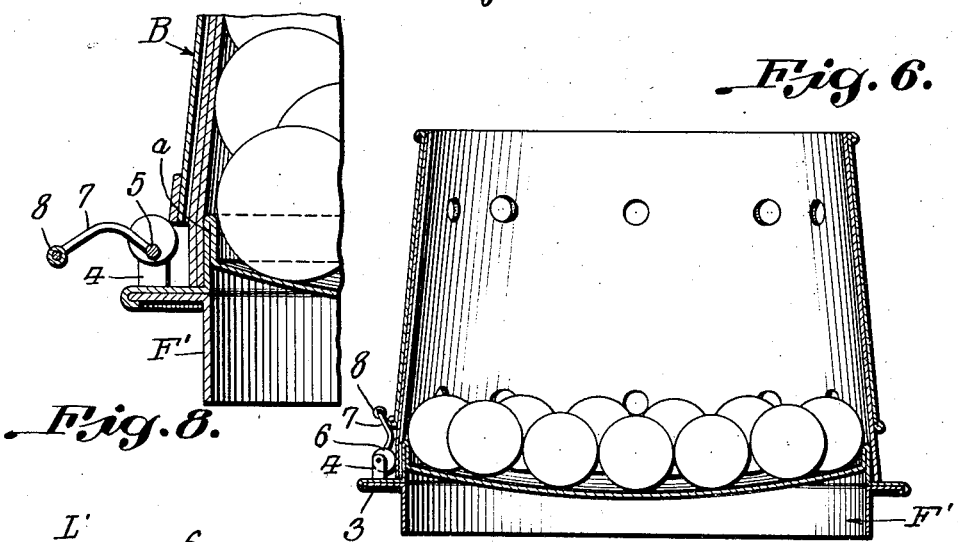
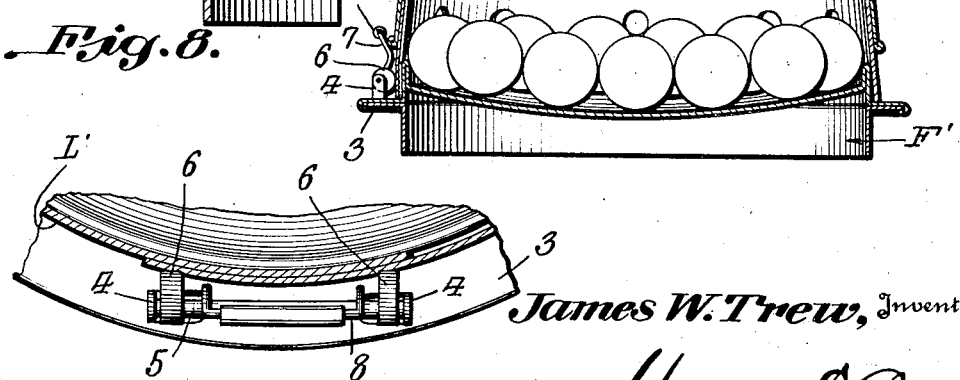
James W. Trew, Inventor
By Watson E. Coleman
Attorney Aug. 7, 1934.                J. W. TREW                1,969,284
              MEANS FOR PACKING FRUIT AND THE LIKE
                    Filed Jan. 17, 1931       3 Sheets-Sheet 3
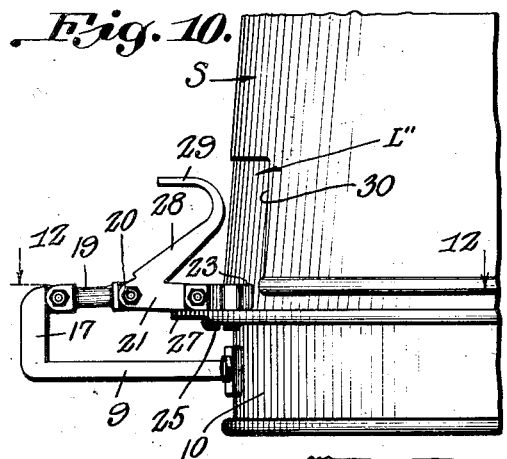
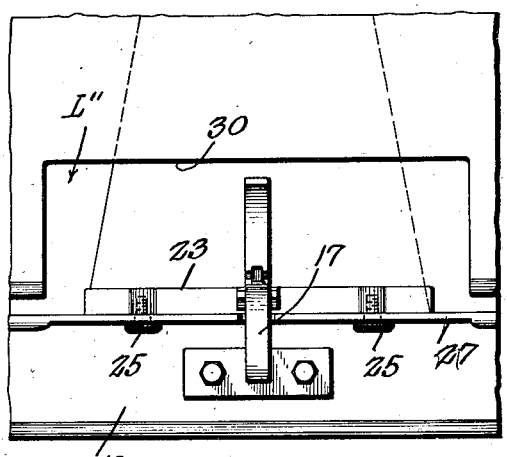
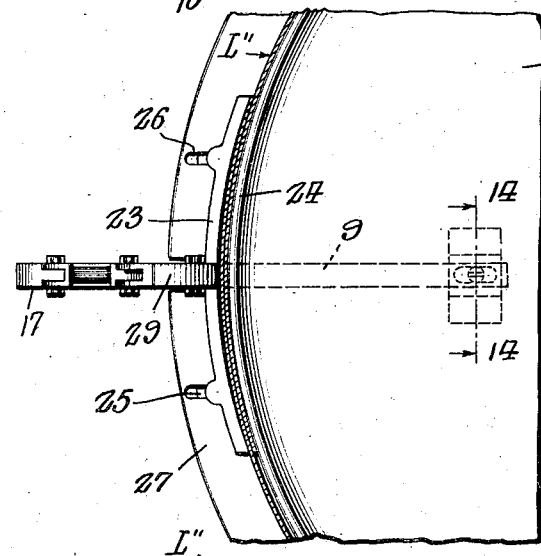
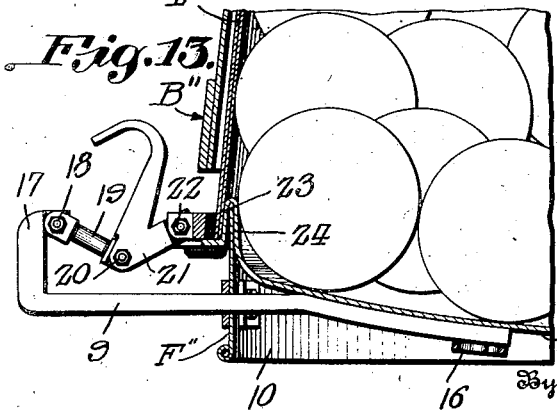
James W. Trew, Inventor Patented Aug. 7, 1934

1,969,284

UNITED STATES PATENT OFFICE 1,969,284

MEANS FOR PACKING FRUIT AND THE LIKE

James W. Trew, Gettysburg, Pa., assignor to Rice, Trew & Rice Co. Inc., Biglerville, Pa., a corporation of Pennsylvania Application January 17, 1931, Serial No. 509,489

26 Claims. (Cl. 226—17)

This invention relates to means for packing fruit and the like and it is an object of the invention to provide a means of this kind including an open liner, the end portions of which being held against slippage when the liner is filled before being received within a container, said extremities also being held in a manner to retain a column of fruit or the like before being applied within a basket or other container.

Another object of the invention is to provide means for packing fruit and the like which consists in placing an inverted basket over a filled liner placed upon a facing form, the liner and its placement upon the form being of a character to allow the liner together with its content to accommodate themselves to the basket while inverted or before the basket and its load is upended.

The invention also has for an object to provide an open liner having associated therewith means for temporarily holding the extremities of the liner together, said means coacting with a marginal portion only of the liner.

A still further object of the invention is to provide an open liner for use in packing fruit or the like, the extremities of which being adapted to overlap, together with means coacting with the overlapping portions of the liner at what may be termed a plurality of circumferentially spaced points to hold the extremities of the liner temporarily against slippage.

The invention consists in the details of construction and in the combination and arrangement of the several parts of my improved means for packing fruit and the like whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in plan or blank of a liner constructed in accordance with an embodiment of my invention;

Figure 2 is a view in elevation illustrating a liner as disclosed in Figure 1 as mounted upon a facing form and holding a column of fruit or the like without any independent support;

Figure 3 is a view in side elevation with a portion broken away of a basket with a liner and its content therein;

Figure 4 is a fragmentary view in perspective of the meeting ends of the liner initially connected as illustrated in Figure 2;

Figure 5 is an elevational view with a portion broken away illustrating a further embodiment of my invention;

Figure 6 is a sectional view taken substantially on the line 6—6 of Figure 5;

Figure 7 is an enlarged fragmentary section taken substantially on the line 7—7 of Figure 5;

Figure 8 is a fragmentary sectional view similar to Figure 7 showing certain of the parts in a second position;

Figure 9 is a fragmentary sectional view taken substantially on the line 9—9 of Figure 5;

Figure 10 is a fragmentary view in elevation illustrating another embodiment of my invention;

Figure 11 is a front elevational view of the structure illustrated in Figure 10;

Figure 12 is a sectional view taken substantially on the line 12—12 of Figure 10;

Figure 13 is a fragmentary view partly in vertical section and partly in elevation of the structure as illustrated in Figure 10;

Figure 14 is an enlarged fragmentary sectional view taken substantially on the line 14—14 of Figure 2;

Figure 15 is a fragmentary view partly in bottom plan and partly in section of the structure as illustrated in Figure 14.

In the embodiment of the invention as particularly illustrated in Figures 1 to 4 inclusive, L denotes a liner comprising a sheet of material, such as cardboard or the like, possessing sufficient strength to substantially eliminate breakage of the wall of the liner when applied within a basket B or other container as a result of the pressure imposed thereon by the weight of the basket content, such as apples or the like. The liner L is preferably formed from a paper stock having the grain disposed in a general direction lengthwise of the liner, thus assuring a wall of a strength not liable to breakage. This position of the grain also causes the liner to have a natural tendency to readily open or spread out, thus facilitating the application of the liner in working position and particularly its placement within a shell or tub now well known in the packing of fruit and the like.

As illustrated in Figure 1, the liner L is of an open type and the wall in blank is arcuate in form with its end margins diverging from the lower longitudinal margin to the opposite margin. This results in one longitudinal edge of the liner L being longer than the other and in practice the end portions of the liner are disposed beyond a plane substantially radial to the ends of the shorter longitudinal margin and adapted to overlap. As illustrated in Figures 2, 3 and 4 such overlapping portions, as at 1, are substantially triangular in form with the apex thereof disposed downwardly in the finished package as illustrated in Figure 3, and before the means for holding the extremities of the liner in overlapping relation becomes ineffective.

The base portions of the lower overlying extremities of the liner L are held against slippage by the strips 2 of relatively light paper stock, said strips being adhesively applied and being engaged by opposite faces of the liner. These strips 2 provide effective means at an end marginal portion of the liner when applied upon a facing form F to hold the liner against slippage, said holding means or strips 2 being associated with the marginal portion of the liner L immediately adjacent to the facing form F.

The liner L before being positioned upon the form F may be placed, as is well known, within a tub or shell so that the liner L will effectively withstand from within resultant strains occurring during the operation of filling the liner L as mounted upon the facing form. After this filling operation, as is well known, the shell or tub is removed and the basket B inverted is placed over the liner L which at that time is supporting its content free of any outside support. As the basket B with its load is upended, as in Figure 3, substantially a finished package is provided.

If the wall of the basket is unduly irregular the strips 2 will readily break as a result of the outward pressure imposed by the load within the liner L, such breakage of the strips 2 permitting slippage of the extremities of the liner L one with respect to the other thereby allowing the basket content to properly set therein, thus assuring a properly filled package.

In the embodiment of my invention as illustrated in Figures 5 to 9 inclusive, the open liner L′, which is of the same form as the liner L, is placed within the shell or tub with its extremities disconnected but with an end portion of such applied liner extending a material distance beyond the adjacent end of the tub or shell S. As the shell or tub S and liner L′ are placed upon a facing form F′ the extended portion of the liner will surround the outer annular wall a of the form F′.

An outstanding flange 3 comprised in the structure of the form F′ is provided with a pair of upstanding posts or arms 4 spaced a desired distance in a direction circumferentially of the wall a, said posts or arms 4 providing supports for a rock shaft 5. This shaft 5 at spaced points thereon carries the eccentrically mounted clamping members 6 which are adapted to clamp to the wall a at spaced points the adjacent marginal portions of the overlapping extremities of the liner L. It is to be understood that in applying the shell or tub S and liner L upon the form F′ the workman takes care to have the overlapping extremities of the liner having proper placement with respect to the clamping members 6.

The shaft 5 is provided therealong with the spaced outstanding arms 7 having their outer end portions connected by a cross member 8 whereby is provided an effective handle for manually rocking the shaft 5 in a direction to bring the members 6 into desired clamping engagement with the overlapping end portions of the liner L′.

When the members 6 are in clamping action as illustrated in Figure 7, the arms 7 are in the path of the inverted basket B′ as applied over the filled liner L′ after, of course, the shell or tub S has been removed. Before the basket or other container B′ reaches the limit of its downward movement, it comes into contact with the arms 7 and continued movement of the basket serves to bring the arms 7 in a direction to move the clamping members 6 out of clamping action with the overlapping portions of the liner L′ so that when the basket B′ with its content is inverted, the extremities of the open liner will be entirely free for slippage to assure the proper adjustment of the content within the basket B′.

While the liners hereinbefore referred to are especially adapted for use in the packing of fruit, it is believed to be clearly understood that the liner in the completed package provides an effective means to protect the content of the basket from injury by coming in contact with the wall of the basket proper or other container.

It is also to be particularly noted that when the basket B is initially applied the release of the overlapping end portions of the liner L permits slippage of such overlapping portions to allow the liner and its content to readily accommodate themselves to the basket, thus eliminating the shaking down of the basket content after the basket has been upended.

In the embodiment of the invention as illustrated in Figures 10 to 15 inclusive, an elongated member or arm 9 is insertible from without through the depending flange 10 of the facing form F′′. The inner portion of the member or arm 9 has close contact from below with the bottom wall 11 of the facing form and the inner extremity of said member or arm is snugly received within a loop bracket 12 suitably secured to the bottom wall 11. The extremity of the member or arm 9 entering the loop bracket 12 is split, as at 14, so that said extremity of the member or arm 9 may be expanded by a wedge screw 15 into close frictional contact with the loop bracket 12 to hold the member or arm 9 in desired selective endwise adjustment. The outer wall of the bracket 12 is provided with an elongated slot 16 to receive the head of the wedge screw 15, said slot permitting the desired adjustment of the member or arm 9.

The outer end portion of the member or arm 9 carries an upstanding post 17 to the upper end portion of which is pivotally connected, as at 18, an end portion of a link 19. This link 19 in turn is pivotally connected, as at 20, with the end portion of a second link 21 which is also pivotally connected, as at 22, to the central portion of an elongated clamping arm 23. This clamping arm 23 is arcuate in form and coacts with the adjacent upstanding peripheral wall 24 to hold against slippage the overlapping end portions of a liner L′′ placed upon the facing form F′′ as a part of the packing operation. The clamping arm 23 is on a radius slightly less than that of the radius of the wall 24 so that most effective clamping action of the member 23 is assured at all times at the extremities thereof.

The link 21 is secured to the member 23 at substantially the longitudinal center thereof and this member 23 adjacent its opposite ends has threaded therein from below the headed members 25, each of which passing through a guide slot 26 provided in the outstanding peripheral flange 27 of the facing form F′′. These headed members 25 assure the member 23 having effective movement toward or from the wall 24 substantially in a fixed path of travel. It is also believed to be obvious that these headed members 25 provide means for maintaining the member 23 in desired placement upon the flange 27.

The outer end portion of the link 21 carries an upwardly and inwardly inclined arm 28 terminating in an upwardly and outwardly curved portion 29. This portion 29 provides an effective handle whereby the link 21 may be manually raised by an operator to force the member 23 inwardly toward the wall 24 to clamp the overlapping portions of the liner L" therebetween. As illustrated in Figure 10, it is to be noted that when the member 23 is in most effective clamping action the pivotal connection 20 between the links 19 and 21 is above the horizontal.

When the member 23 is in clamping position, the upper end portion of the arm 28 is in position to be engaged by the inverted basket B" when placed over the filled liner L". This contact will result in an outward swinging of the arm 28 and a consequent downward movement of the pivotal connection 20 between the links 19 and 21 causing the member 23 to move outwardly or into release position as particularly illustrated in Figure 13.

When the member 23 is moved into release the overlapping end portions of the liner L" are free for relative slippage whereby said liner and its content may readily accommodate themselves to the basket before being upended and without the necessity of shaking down the basket and its content after being upended.

In this embodiment of the invention the liner L" is also split and is applied within a shell S' and which shell with its applied liner is placed in a well known manner upon the facing form F" after the layer face of fruit or the like has been arranged upon the facing form. After the shell or tub with its applied liner has been filled the shell or tub S' is removed and the inverted basket B" applied. In order that the shell or tub S' will offer no hindrance or obstruction to the clamping means the lower or larger end of the tub or shell S' has its wall provided with a relatively large cut-out portion 30. As illustrated in Figures 10 and 11 said cut-out portion readily receives the clamping member 23 when the tub or shell S' with its liner is applied upon the facing form F", thus assuring the clamping member 23 to have desired effective clamping action upon the overlapping portions of the liner L".

By having the curvature of the clamping member 23 on a radius less than the radius of the coacting wall 24 of the facing form F" sufficient yield of the member 23 is permitted when the same is brought into clamping engagement with the overlapping end portions of the liner L" to permit the connection 20 to pass up beyond the horizontal.

From the foregoing description it is thought to be obvious that a means for packing fruit and the like constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An apparatus for packing fruit comprising a facing form and a supporting shell adapted to be positioned on the facing form, the facing form having incorporated in its structure a cam for coaction with a surface of the facing form for securing the overlapping disconnected ends of a liner in operative position upon the facing form while the shell is removed and prior to placing the basket over the liner, said cam being movable into released position after the basket is placed over the liner to permit the liner to expand so as to adjust itself to the interior of the basket.

2. An apparatus for packing fruit comprising a facing form and a supporting shell adapted to be positioned on the facing form, the facing form having incorporated in its structure a cam for coaction with a surface of the facing form for securing the overlapping disconnected ends of a liner in operative position upon the facing form while the shell is removed and prior to placing the basket over the liner, said cam being movable into released position after the basket is placed over the liner to permit the liner to expand so as to adjust itself to the interior of the basket, said cam having a part associated therewith with which the basket contacts while being applied over the liner to move the cam into released position.

3. An apparatus for packing fruit comprising a facing form and a supporting shell adapted to be positioned on the facing form, a member mounted upon the facing form for swinging movement for coaction with a surface of the facing form for securing the overlapped disconnected ends of a liner in operative position while the shell is removed and prior to placing the basket over the liner, said member when swung in one direction releasing the ends of the liner to permit the liner to expand so as to adjust itself to the interior of the basket.

4. An apparatus for packing fruit comprising a facing form and a supporting shell adapted to be positioned on the facing form, a member mounted upon the facing form for swinging movement for coaction with a surface of the facing form for securing the overlapped disconnected ends of a liner in operative position while the shell is removed and prior to placing the basket over the liner, and a part carried by said member with which the basket engages when being applied over the liner to move the member in a direction to release the ends of the liner to permit the liner to expand so as to adjust itself to the interior of the basket.

5. In a packer, the combination with a facing form, of an initially split liner having overlapping ends and arranged on the facing form, means mounted on the form exterior of the liner for releasably holding said liner to the facing form, said means being removable with the facing form after the basket is placed over the liner and said means released from the liner.

6. In a packer, the combination with a facing form, of an initially split liner having overlapping ends and arranged on the facing form, and means mounted on the form exterior of the liner for releasably holding said liner to the facing form, said means being removable with the facing form after the basket is placed over the liner and said means released from the liner, said facing form having an upstanding annular shoulder about which the liner fits, said means coacting with the shoulder.

7. In a packer, the combination with a facing form provided with an upstanding shoulder, of an initially split liner having lapping end portions fitted about the shoulder, a swinging clamping member mounted upon the form exteriorly of the liner and coacting with the shoulder to clamp the lapping end portions of the liner to the form and to hold the liner on the form, said clamping member being removable with the form after the basket has been applied and the clamping member released.

8. In a packer, the combination with a facing form provided with an upstanding shoulder, of an initially split liner having lapping end portions fitted about the shoulder, a swinging clamping member mounted upon the form exteriorly of the liner and coacting with the shoulder to clamp the lapping end portions of the liner to the form and to hold the liner on the form, said clamping member being removable with the form after the basket has been applied and the clamping member released, and a part associated with the clamping member with which the basket engages when applied over the liner for moving the clamping member into released position.

9. In a packer, the combination with a facing form, of an initially split liner having overlapping end portions and arranged on the form, said form having a shoulder about which said overlapping portions fit, a clamping member carried by the form for movement toward or from the shoulder and coacting with the shoulder to clamp the overlapping portions of the liner to the shoulder, and means for moving said member toward the shoulder to clamp said overlapping portions.

10. In a packer, the combination with a facing form, of an initially split liner having overlapping end portions and arranged on the form, said form having a shoulder about which said overlapping portions fit, a clamping member carried by the form for movement toward or from the shoulder and coacting with the shoulder to clamp the overlapping portions of the liner to the shoulder, means for moving said member toward the shoulder to clamp said overlapping portions, and an arm carried by said member and which is engaged by the basket when the basket is applied over the liner to move the member away from the shoulder to release the overlapping portions of the liner.

11. In a packer, a facing form provided with a shoulder about which are adapted to fit overlapping end portions of a split liner applied on the form, a movable member mounted on the form outwardly of the applied liner and movable with respect to the shoulder to clamp the overlapping portions of the liner to the shoulder and means, operating when a basket is being applied over the liner upon the form to move the member away from the shoulder to release the overlapping portions of the liner.

12. In a packer, a facing form having a shoulder about which is adapted to fit the lapping end portions of a split liner, an eccentrically mounted member carried by the form at a point outwardly of an applied liner for coaction with the shoulder to clamp the lapping portions of the liner to the shoulder.

13. In a packer, a facing form having a shoulder about which is adapted to fit the lapping end portions of a split liner, an eccentrically mounted member carried by the form at a point outwardly of an applied liner for coaction with the shoulder to clamp the lapping portions of the liner to the shoulder, and a part carried by said eccentrically mounted member with which is adapted to engage a basket when applied over the liner on the form to rotate the eccentrically mounted member in a direction to release the overlapping end portions of the liner clamped to the shoulder.

14. In a packer, a facing form having a shoulder about which is adapted to fit the overlapping end portions of a split liner, an elongated clamping member freely resting upon the form for coaction with the shoulder to clamp the overlapping portions of the liner to the shoulder, said member and form having coacting means for guiding the member in its movement toward or from the shoulder and for holding the same upon the form, and means for moving said elongated member toward or from the shoulder.

15. In a packer, a facing form having a shoulder about which is adapted to fit the overlapping end portions of a split liner, an elongated clamping member freely resting upon the form for coaction with the shoulder to clamp the overlapping portions of the liner to the shoulder, said member and form having coacting means for guiding the member in its movements toward or from the shoulder and for holding the same upon the form, and means for moving said elongated member toward or from the shoulder, said means including a part with which a basket engages when applied over the liner on the form to move the elongated member away from the shoulder to release the overlapping portions of the liner.

16. In a packer, a facing form having a shoulder about which is adapted to fit the overlapping end portions of a split liner, an elongated clamping member freely resting upon the form for coaction with the shoulder to clamp the overlapping portions of the liner to the shoulder, said member and form having coacting means for guiding the member in its movements toward or from the shoulder and for holding the same upon the form, means for moving said elongated member toward or from the shoulder, and means carried by the form and operatively engaged with the elongated member for imparting an initial adjustment to the elongated member with respect to the shoulder.

17. In combination, a facing form having a shoulder about which is adapted to fit the overlapping end portions of a split liner, an arm carried by and extending outwardly from the form, a clamping member slidably mounted on the form for movement toward and from the shoulder, rigid links pivotally connected to each other and to the clamping member and to the outer end portion of the arm, swinging movement of the links sliding the clamping member toward or from the shoulder.

18. In combination, a facing form having a shoulder about which is adapted to fit the overlapping end portions of a split liner, an arm carried by and extending outwardly from the form, a clamping member slidably mounted on the form for movement toward and from the shoulder, rigid links pivotally connected to each other and to the clamping member and to the outer end portion of the arm, swinging movement of the links sliding the clamping member toward or from the shoulder, and an operating arm carried by one of the links and extending beyond the working face of the form.

19. In combination, a facing form having a shoulder about which is adapted to fit the overlapping end portions of a split liner, an arm carried by and extending outwardly from the form, a clamping member slidably mounted on the form for movement toward and from the shoulder, rigid links pivotally connected to each other and to the clamping member and to the outer end portion of the arm, swinging movement of the links sliding the clamping member toward or from the shoulder, and an operating arm carried by one of the links and extending beyond the working face of the form, the operating arm being of a length and disposed in a direction to be engaged by a basket when being placed over the liner to swing the links in a direction to move the clamping member into released position.

20. The combination of a facing plate including an annular uprising shoulder and a clamp attached permanently to said facing plate and constructed to pinch a liner against said shoulder.

21. The combination of a facing plate including an annular uprising shoulder and a clamp attached permanently to said facing plate and constructed to pinch a liner against said shoulder, said clamp being normally spaced relatively far from the top of said shoulder so as not to obstruct the preliminary arranging of a liner around said shoulder.

22. The combination of a facing form having a rim adapted for the reception of a liner therearound, a flange on the outside of said rim, and a clamping member pivotally mounted on said flange and having a clamping end adapted to clamp said liner by a pinching action against said rim.

23. The combination of a facing form having an upstanding rim thereon, and means secured to said form for clamping a liner by a pinching action against said rim at an isolated point.

24. The combination of a facing form having an upstanding rim thereon, and means secured to said form for clamping a liner by a pinching action against said rim at a plurality of isolated points symmetrically arranged.

25. The combination of a facing form having an upstanding rim adapted for the reception of a liner therearound, and a clamping member pivotally mounted on said facing form and having a clamping end adapted to clamp said liner by a pinching action against said rim.

26. Apparatus for packing fruit comprising a face plate and a supporting shell adapted to be positioned on the face plate, the face plate having incorporated in its structure means for securing the overlapped disconnected ends of a liner in operative position while the shell is removed and prior to placing the basket over the liner, said means being removable with the face plate after the basket is placed over the liner and releasable from the two ends of the liner to permit the liner to expand so as to adjust itself to the interior of the basket.

JAMES W. TREW.